United States Patent [19]

Smith

[11] 4,360,630

[45] Nov. 23, 1982

[54] COMPOSITIONS OF AROMATIC POLYETHERKETONES AND GLASS AND/OR CARBON FIBRES

[75] Inventor: Clive P. Smith, Wheathampstead, England

[73] Assignee: Imperial Chemical Industries Limited, London, England

[21] Appl. No.: 210,529

[22] Filed: Nov. 25, 1980

[30] Foreign Application Priority Data

Dec. 14, 1979 [GB] United Kingdom ................. 7943101
May 7, 1980 [GB] United Kingdom ................. 8015112

[51] Int. Cl.$^3$ ............................................. C08L 61/00
[52] U.S. Cl. ..................................... 524/592; 524/609; 524/611; 528/86; 528/90; 528/99; 528/125
[58] Field of Search ................... 260/37 R; 528/90, 99, 528/125, 86; 524/592, 609, 611

[56] References Cited

FOREIGN PATENT DOCUMENTS

| 1879 | 2/1979 | European Pat. Off. | .......... 260/37 R |
|---|---|---|---|
| 1383393 | 2/1975 | United Kingdom | ............. 260/37 R |
| 1387303 | 3/1975 | United Kingdom | ............. 260/37 R |
| 1414421 | 11/1975 | United Kingdom | ............. 260/37 R |

Primary Examiner—J. Ziegler
Attorney, Agent, or Firm—Cushman, Darby & Cushman

[57] ABSTRACT

A melt-fabricatable or melt-fabricated composition comprising (i) a crystalline thermoplastic aromatic polyetherketone containing the repeat unit

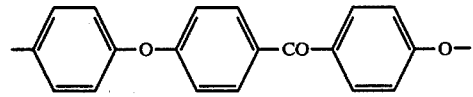

alone or in conjunction with other repeat units said polymer having an inherent viscosity of at least 0.7 and (ii) a glass and/or carbon fibre reinforcing agent, which composition is melt-fabricatable into a composition exhibiting, or alternatively (if melt-fabricated) exhibits, an increase in heat deflection temperature (HDT) of at least 3° C. per 1% by weight of reinforcing agent above the HDT of the unreinforced polyetherketone and an increase in flexural modulus of at least 0.2 $GN_m^{-2}$ per 1% by weight of reinforcing agent above the flexural modulus of the unreinforced polyetherketone.

8 Claims, No Drawings

COMPOSITIONS OF AROMATIC POLYETHERKETONES AND GLASS AND/OR CARBON FIBRES

The present invention relates to melt-fabricatable or melt-fabricated compositions of certain thermoplastic aromatic polyetherketones and glass and/or carbon fibres.

In our European Patent Publication No. 1 879 there is disclosed crystalline thermoplastic aromatic polyetherketones containing the repeat unit

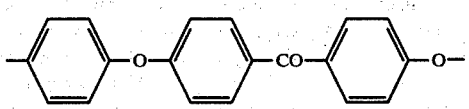

alone or in conjunction with other repeat units, said polymers having inherent viscosity IV (measured at 25° C. on a solution of the polymer in concentrated sulphuric acid of density 1.84 g cm$^{-3}$, said solution containing 0.1 g of polymer per 100 cm$^3$ of solution) of at least 0.7. These polymers are exceptionally useful in that they possess excellent mechanical and electrical properties, coupled with outstanding thermal and combustion characteristics. They also show resistance to a very wide range of solvents and propietary fluids. They are thus very suitable in applications where the service conditions are too demanding for the more established engineering plastics and in particular where the polymers are liable to high service temperatures.

We have now discovered that an outstanding improvement in certain mechanical properties of these polymers may be achieved by using them in a composition containing a glass and/or carbon fibre reinforcing agent.

According to the present invention there is provided a melt-fabricatable or melt-fabricated composition comprising (i) a crystalline thermoplastic aromatic polyetherketone containing the repeat unit

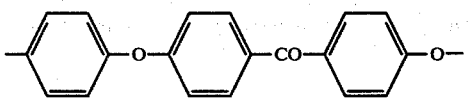

alone or in conjunction with other repeat units said polymer having an inherent viscosity of at least 0.7 and (ii) a glass and/or carbon fibre reinforcing agent, which composition is melt-fabricatable into a composition exhibiting, or alternatively (if melt-fabricated) exhibits, an increase in heat deflection temperature (HDT), measured according to ASTM D 648, of at least 3° C. per 1% by weight of reinforcing agent in the composition above the HDT of the unreinforced polyetherketone, and an increase in flexural modulus, measured according to ASTM D 790 of at least 0.2 GNm$^{-2}$ per 1% by weight of reinforcing agent in the composition above the flexural modulus of the unreinforced polyetherketone.

It has been found that the heat deflection temperature (HDT), also known as the deflection temperature under flexural load, and flexural modulus, show an outstanding increase in comparison to the unreinforced polymer. For example HDT's which are of the same order as thermosets can be achieved, the compositions nevertheless still being thermoplastic.

It is preferred that the amount of glass and/or carbon fibre reinforcing agent in the composition is within the range 1 to 70% by weight of the composition. The use of less than 1% by weight of glass and/or carbon fibre reinforcing agent may not provide a very significant effect on the HDT of flexural modulus, while the use of greater than 70% by weight of glass and/or carbon fibre reinforcing agent might result in the polyetherketone being inadequately dispered between the reinforcing fibres.

The effect of the glass and/or carbon fibre reinforcing agent in the present invention would appear to be specific, since other common fillers that we have examined do not provide anything like such a significant effect on HDT and flexural modulus.

The glass and/or carbon fibre reinforcing agent may be in the form of continuous or discontinuous fibres, e.g. in the form of rovings, chopped and milled fibres, or cloths and mats. The compositions may be in the form of blends of the polyetherketones and glass and/or carbon fibre reinforcing agents made by admixture of the materials in a suitable mixing machine to effect particle or melt blending, or articles e.g. mouldings or extrusions melt-fabricated therefrom. In such cases it is preferred that the amount of glass reinforcing agent is <40°% by weight of the composition. Alternatively, the compositions may be moulded laminates of films, foils, or powder/granules of the polyetherketones with glass and/or carbon fibre mats or cloths.

The melt-fabricatable or melt-fabricated compositions of the invention may be melt-fabricated into useful commercial articles, e.g. electrical terminal blocks, where their excellent HDTs and flexural modui are a valuable asset.

Accordingly, there is further provided according to the invention an article melt-fabricated from a composition as defined above.

Alternatively, a melt-fabricated composition according to the invention may itself be a commercially useful article.

The terms "melt-fabricatable" or "melt-fabricated" are intended to refer to melt-fabrication operations such as injection moulding, compression moulding and extrusion.

The preparation of the aromatic polyetherketones used in the present invention may be conveniently effected as described in European Patent Publication No. 1 879 the method described therein comprising polycondensing, under substantially anhydrous conditions, at least one bisphenol which is or includes hydroquinone and at least one aromatic dihalide in which the halogen atoms are activated by —CO— or —SO$_2$— groups ortho or para thereto which at least one dihalide is or includes 4,4'-difluorobenzophenone, there being substantially equimolar amounts of bisphenol and aromatic dihalide, in the presence of sufficient of at least one alkali metal carbonate or bicarbonate such that there is at least 2 gram atoms of alkali metal per mole of bisphenol, the alkali metal or metals being selected from sodium, potassium, rubidium, and caesium provided that the sole use of sodium carbonate and/or bicarbonate is excluded, and in the presence of a solvent having the formula

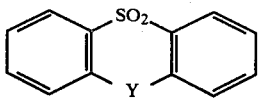

where Y is a direct link, an oxygen atom or two hydrogen atoms (one attached to each benzene ring) and Z and Z' are hydrogen or phenyl groups, within the temperature range 150° to 400° C., preferably 200° to 400° C., the final temperature level during the polycondensation being sufficiently high to maintain the final polymer in solution, such that a polymer having IV of at least 0.7 is obtained.

The hydroquinone may be used with other bisphenols so as to produce copolymers. Likewise the 4,4'-difluorobenzophenone may be used with other dihalides in which the halogen atoms are activated by —$SO_2$— or —CO— groups ortho or, preferably, para thereto.

Other bisphenols that may be used with the hydroquinone include bisphenols of formula

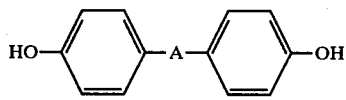

in which A is a direct link, oxygen, sulphur, —$SO_2$—, —CO—, or a divalent hydrocarbon radical.

Other dihalides that may be used with the 4,4'-difluorobenzophenone include dihalides having the formula

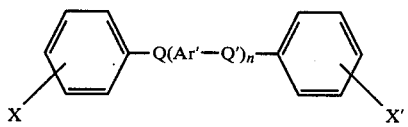

in which X and X', which may be the same or different, are halogen atoms and are ortho or para—preferably the latter—to the groups Q and Q'; Q and Q', which may be the same or different, are —CO— or —$SO_2$—; Ar' is a divalent aromatic radical; and n is 0, 1, 2 or 3.

It is preferred that the amount of cocondensant(s) if employed is such that the polyetherketone produced contains at least 50%, particularly at least 70%, of repeat units I.

Flexural modulus in this specification is measured according to ASTM D 790 (Method I, Procedure A, temperature 23° C.), this parameter being termed Tangent Modulus of Elasticity in ASTM D 790.

The present invention is illustrated by the following examples.

EXAMPLES 1 TO 3

A particulate thermoplastic aromatic polyetherketone containing only repeat units

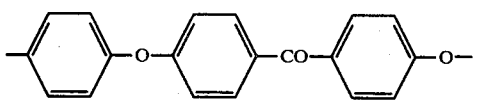

and having IV of 0.8 and melt viscosity (MV) of 0.5 was injection moulded unreinforced (Example 1) using a 3 oz Ankewerk injection moulding machine (barrel temperature profile: rear zone 350° C., middle zone 365° C., front zone 370° C., nozzle 380° C; mould temperature 150° C.) to produce moulded specimens suitable for the determination of flexural modulus according to ASTM D 790, the dimensions of the specimens being 215.9 mm×12.70 mm×3.17 mm. Further bars were machined from these specimens suitable for the determination of heat deflection temperature according to determination of heat deflection temperature according to ASTM D 648, the dimensions of the specimen being 100 mm×12.70 mm×3.17 mm. Compositions of the above polymer with a fibrous glass reinforcing agent (3 mm-Owens Corning 497) were prepared by admixture of the materials using melt extrusion on a 38 mm Plaston extruder into lace (subsequently cut into granules), the levels of glass being 10% by weight of the composition (Example 2) and 20% by weight of the composition (Example 3). Injection moulded specimens for testing were similarly prepared from the reinforced compositions. The properties were measured and are indicated in the following table:

| Ex No | % Glass Reinfg Agent (by wt of compn) | HDT (°C.) at 1.81 $MNm^{-2}$ | Increase in HDT per 1% Agent in compn(°C.) | Flexural Modulus ($GNm^{-2}$) | Increase in Flexural Modulus per 1% Agent in compn ($GNm^{-2}$) |
|---|---|---|---|---|---|
| 1 | 0 | 155 | — | 3.68 | — |
| 2 | 10 | 209 | 5.4 | 6.34 | 0.27 |
| 3 | 20 | 291 | 6.8 | 10.54 | 0.34 |

It can be seen that the glass reinforcing agent induces an outstanding improvement in the HDT and modulus of the polyetherketone.

EXAMPLES 4 TO 7

Moulded specimens for HDT and flexural modulus measurement were prepared as in Examples 1 to 3, but using calcined clay (Example 5), wollastonite (calcium metasilicate—Example 6) and amorphous silica (Example 7) as the reinforcing agents; moulded specimens for a control (0% reinforcing agent) were also prepared (Example 4). The mechanical properties are shown in the following table.

| Ex No | Reinforcing Agent | % Reinfg Agent by wt of compn | HDT (°C.) at 1.81 $MNm^{-2}$ | Increase in HDT per 1% Agent in compn | Flexural Modulus ($GNm^{-2}$) | Increase in Flexural Modulus per 1% Agent in compn ($GNm^{-2}$) |
|---|---|---|---|---|---|---|
| 4 | — | 0 | 156 | — | 3.82 | — |
| 5 | Calcined Clay | 10 | 158 | 0.3 | 4.40 | 0.06 |
|   |   | 20 | 162 | 0.4 | 5.16 | 0.07 |
|   |   | 30 | 196 | 1.4 | 6.70 | 0.10 |
|   |   | 40 | 212 | 1.4 | 7.62 | 0.10 |
| 6 | Wollastonite | 10 | 158 | 0.3 | 4.44 | 0.06 |
|   |   | 20 | 160 | 0.3 | 5.48 | 0.08 |
|   |   | 30 | 170 | 0.5 | 6.28 | 0.08 |
| 7 | Amorphous Silica | 10 | 156 | 0.1 | 4.26 | 0.04 |
|   |   | 20 | 160 | 0.3 | 4.76 | 0.05 |
|   |   | 30 | 162 | 0.2 | 5.80 | 0.07 |

It can be seen that the fillers used in Examples 5, 6 and 7 have much less effect on the HDT and flexural modulus of the polyetherketone than the glass fibres used in Examples 2 and 3.

EXAMPLES 8 AND 9

Moulded Specimens for HDT and flexural modulus measurement were prepared as in Examples 1 to 3, but using carbon fibre (Example 9) as the reinforcing agent (2 mm) at a level of 30% by weight of the composition; moulded specimens for a control (0% reinforcing agent) were also prepared (Example 8). The mechanical properties are shown in the following table.

| Ex No | % Carbon Fibre Reinfg Agent (by wt of compn) | HDT (°C.) at 1.81 MNm$^{-2}$ | Increase in HDT per 1% Agent in compn(°C.) | Flexural Modulus (GNm$^{-2}$) | Increase in Flexural Modulus per 1% Agent in compn (GNm$^{-2}$) |
|---|---|---|---|---|---|
| 8 | 0 | (155)* | — | 3.25 | — |
| 9 | 30 | 305 | 5.0 | 12.70 | 0.31 |

*not actually measured but assumed to be the value of Example 1.

It can be seen that the carbon fibre reinforcing agent induces an outstanding improvement in the HDT and flexural modulus of the polyetherketone.

I claim:

1. A melt-fabricatable or melt-fabricated composition comprising (i) a crystalline thermoplastic aromatic polyetherketone containing the repeat unit

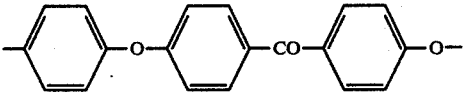

alone or in conjunction with other repeat units, said polyetherketone containing at least 50% molar of the repeat unit I and having an inherent viscosity of at least 0.7 and (ii) at least one of a glass or carbon reinforcing agent, which composition is melt-fabricatable into a composition exhibiting, or melt-fabricated exhibits, an increase in heat deflection temperature, measured according to ASTM D 648, of at least 3° C. per 1% by weight of reinforcing agent in the composition above the heat deflection temperature of the unreinforced polyetherketone, and an increase in flexural modulus, measured according to ASTM D 790, of at least 0.2 GNm$^{-2}$ per 1% by weight of reinforcing agent in the composition above the flexural modulus of the unreinforced polyetherketone.

2. A composition according to claim 2 wherein the amount of at least one of glass or carbon reinforcing agent in the composition is within the range 1 to 70% by weight of the composition.

3. A composition according to either claim 1 or claim 2 wherein reinforcing agent is glass fibre only.

4. A composition according to claim 1 or claim 2 wherein the reinforcing agent is carbon fibre only.

5. A composition according to any one of the preceding claims 1–4 in the form of a blend produced by particle mixing.

6. A composition according to any one of claims 1 to 4 in the form of a blend produced by melt mixing.

7. A composition according to any one of claims 1 to 5 in the form of a melt-fabricated article.

8. An article melt-fabricated from a composition according to any one of claims 1 to 6.

* * * * *